(12) United States Patent
Wu

(10) Patent No.: US 10,436,435 B2
(45) Date of Patent: Oct. 8, 2019

(54) HIGH INTENSITY ILLUMINATION LED WORK LIGHT ASSEMBLY

(71) Applicant: Jiasheng Wu, Reading, MA (US)

(72) Inventor: Jiasheng Wu, Reading, MA (US)

( * ) Notice: Subject to any disclaimer, the term of this patent is extended or adjusted under 35 U.S.C. 154(b) by 121 days.

(21) Appl. No.: 15/791,708

(22) Filed: Oct. 24, 2017

(65) Prior Publication Data

US 2019/0120475 A1 Apr. 25, 2019

(51) Int. Cl.

| | | |
|---|---|---|
| *F21V 29/76* | (2015.01) | |
| *F21V 23/00* | (2015.01) | |
| *F21V 21/40* | (2006.01) | |
| *H02J 7/00* | (2006.01) | |
| *F21V 14/02* | (2006.01) | |
| *F21V 23/04* | (2006.01) | |
| *F21L 4/04* | (2006.01) | |
| *F21V 21/06* | (2006.01) | |
| *F21V 21/30* | (2006.01) | |
| *F21V 29/89* | (2015.01) | |
| *F21Y 115/10* | (2016.01) | |
| *F21W 131/402* | (2006.01) | |
| *F21Y 105/10* | (2016.01) | |

(52) U.S. Cl.
CPC ............. *F21V 29/763* (2015.01); *F21L 4/04* (2013.01); *F21V 14/02* (2013.01); *F21V 21/06* (2013.01); *F21V 21/30* (2013.01); *F21V 21/40* (2013.01); *F21V 23/009* (2013.01); *F21V 23/04* (2013.01); *H02J 7/0045* (2013.01); *F21V 29/89* (2015.01); *F21W 2131/402* (2013.01); *F21Y 2105/10* (2016.08); *F21Y 2115/10* (2016.08)

(58) Field of Classification Search
None
See application file for complete search history.

(56) References Cited

U.S. PATENT DOCUMENTS

| | | | | |
|---|---|---|---|---|
| 7,780,318 B2* | 8/2010 | Xiao | ....................... | F21V 21/30 362/371 |
| D645,594 S * | 9/2011 | Grawe | ......................... | D26/63 |
| 9,353,924 B2* | 5/2016 | Scarlata | .................... | F21S 9/00 |
| D799,094 S * | 10/2017 | Li | ................... | D26/63 |
| 2007/0242939 A1* | 10/2007 | Cutler | ..................... | F21V 21/30 396/62 |
| 2008/0310162 A1* | 12/2008 | Thomas | .................. | F21V 15/01 362/249.01 |
| 2009/0262533 A1* | 10/2009 | Liu | ......................... | F21S 8/086 362/249.02 |
| 2011/0235330 A1* | 9/2011 | Pedersen | ................. | F21V 21/30 362/249.03 |
| 2012/0250321 A1* | 10/2012 | Blincoe | .................... | F21V 7/00 362/247 |
| 2015/0198310 A1* | 7/2015 | Scarlata | ............... | F21V 29/507 362/249.01 |

* cited by examiner

*Primary Examiner* — Elmito Breval
(74) *Attorney, Agent, or Firm* — Jie Tan; JT Law Services, PC

(57) ABSTRACT

An LED high intensity illumination work light assembly including a front portion and a back casing with a circuit box housed in the middle. On the left and right sides of the back casing portion are configured threaded receiving holes for fixing the work light assembly to a supporting frame at a selected angle, and on the back section of the back casing are figured with two protruding fin plates that can fix the LED work light to a supporting surface that is close to the user in the working area.

10 Claims, 16 Drawing Sheets

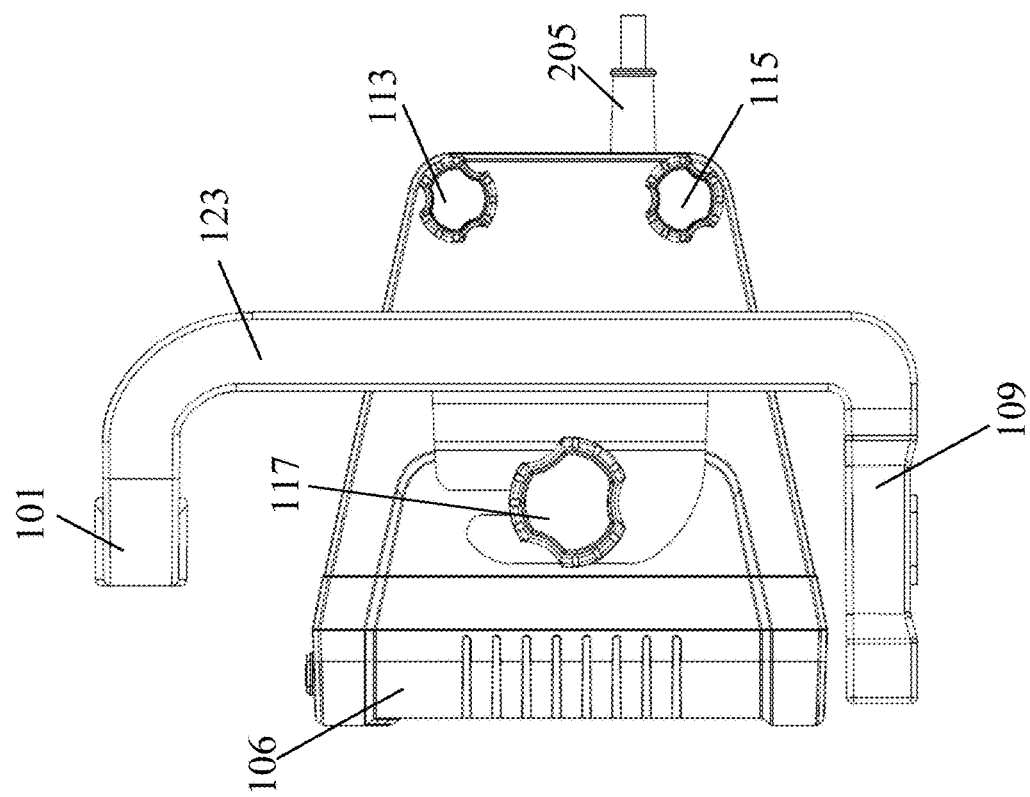
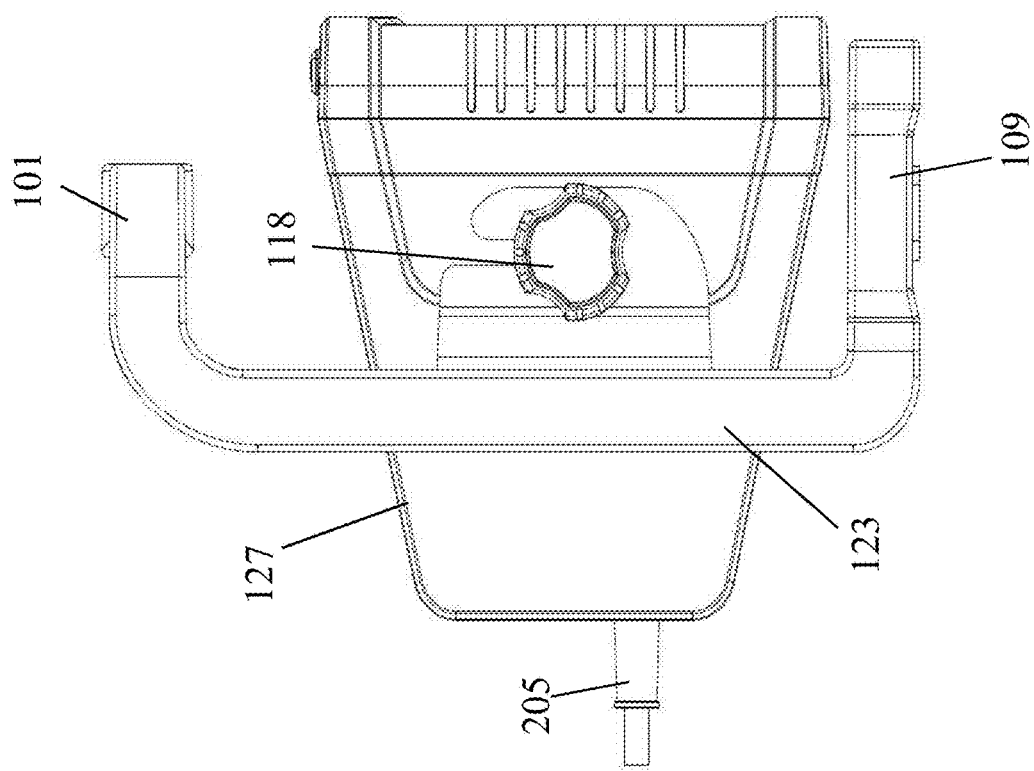
FIG. 7A
FIG. 7B

HIGH INTENSITY ILLUMINATION LED WORK LIGHT ASSEMBLY

FIELD OF THE INVENTION

The present application relates to a LED work light, and more particularly to a duel powered high intensity illumination LED work light with a fixture that can be cost-effectively assembled and that also enables it to be easily mounted in work area that is within the easy access to the user during lighting for providing desired illumination.

BACKGROUND

Note that the points discussed below may reflect the hindsight gained from the disclosed inventions, and are not necessarily admitted to be prior art.

Work lights, area lights or kick lights are commonly used for lighting purposes for work areas that are otherwise difficult to light. The lighting requirements include illuminations of ceiling spaces, basement areas, poorly illuminated construction areas, and the like. Work lights aim to provide high intensity illumination and the lighting fixtures usually comprise the use of high-intensity discharge lamps which are now commonly made in LEDs and in LED arrays. The use of LEDs increases the efficiency and the life span of a battery.

However, because LED arrays require the use of electronic circuits and drivers which are heat sensitive, and high intensity illumination produces significant amount of heat, LED work light fixtures of high intensity illumination generally requires complicated heat dissipation mechanisms and are expensive to assemble. LED work light fixtures of high intensity illumination thus face the challenge of being cost effective and more user friendly.

SUMMARY

The present application provides, in one preferred embodiment, a dual powered LED work light assembly that has an LED lamp providing adjustable high intensity illumination with efficient heat dissipation with prolonged battery life span and a housing fixture that is easy for manufacturing and assembly.

The work light assembly, in one aspect, includes a housing fixture and an independent carrying frame. The carrying frame comprises an entire piece of metal frame bent into three sections including a handle section, a middle standing section and a bottom supporting section, on the middle standing section provides a pair of mounting ear-fins having a slit for mounting the work light housing. The slit on the mounting ear-fins enables the mounting angles of the light fixture be adjustable at the time of use.

The work light assembly, in another aspect, includes an assembled housing fixture including a front portion structure, a middle portion, a back portion structure. The front portion anchors an LED lamp for high intensity illumination, the middle portion is a circuit box containing the electric driver and electronic components, the front portion and the middle portion is separated with the metal heat dissipation plate. The back portion comprises a top side, a bottom side, a left side and right side, each is disposed with a tube receptacle for receiving a knob stud for fixing the LED lamp onto the supporting frame. The top side and the bottom side contain and protect the middle circuit box and are constructed with heat sinks for dissipating heat from the LED lamp. The back portion comprises an opening for a battery connector of the middle portion and for insertion in of various power tool battery adapters that accommodate to various different models of rechargeable power tool rechargeable batteries. The battery connector and the coupled battery adapter are configured to receive a power tool battery pack having a voltage of at least 18 volts, and at the same time can function as a battery charger so that the battery can be recharged with an external power source while the work light is in use. On the top portion of the housing, a switch is operable to switch between a 8.5 W power setting and a 25 W power setting that provides at 1000 to 3000 Lux light intensity.

In in one preferred embodiment, the back portion is a casing constructed with a pair of parallel plate fins that are equipped with a pair of knobs for mounting the work light to a work area that can be easily accessed by the user. The back portion also includes a large pair of heat sinks for heat dissipation.

The term "LED" refers to Light Emitting Diodes arranged in an array. A light emitting diode is a two-lead semiconductor p-n junction diode that emits light when activated. LEDs are typically integrated with optical components to shape the radiation.

The term "high intensity illumination" refers to light intensity that is higher than 600 Lux.

The term "work light" refers to a lighting device that produces high intensity illumination for a work area, such as plumbing work sites, ceiling spaces, basement areas, construction sites, or the like, preferably, such work light is capable of utilizing dual power sources of both a power tool battery or an AC electric supply source.

BRIEF DESCRIPTION OF THE DRAWINGS

The disclosed application will be described with reference to the accompanying drawings, which show important sample embodiments of the invention and which are incorporated in the specification hereof by reference, wherein:

FIG. 7A and 7B are side views of an example LED work light in accordance with this application.

DETAILED DESCRIPTION OF SAMPLE EMBODIMENTS

Figure 1A:
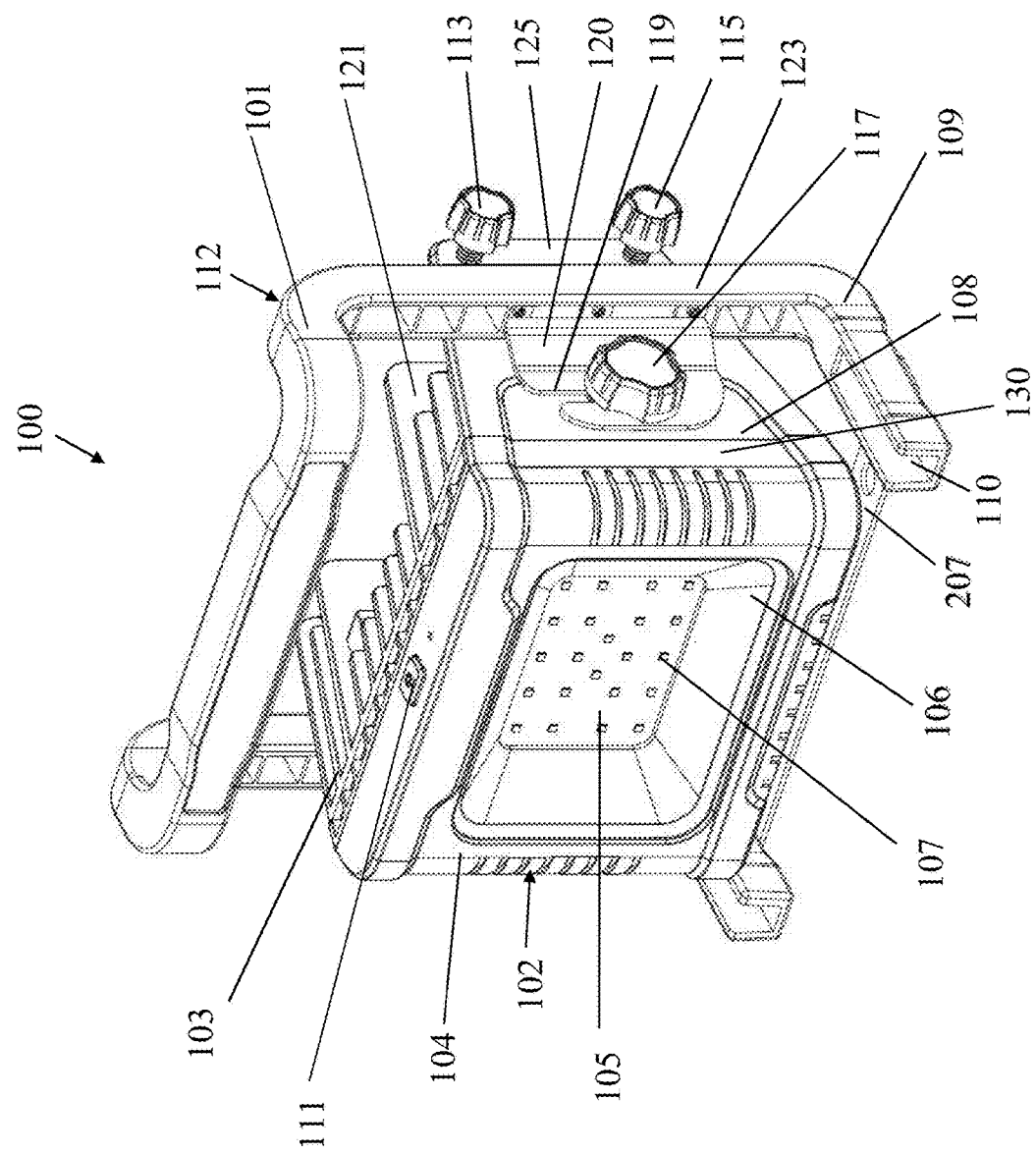
FIG. 1A is a left side perspective view of an example LED work light in accordance with this application.

The numerous innovative teachings of the present application will be described with particular reference to presently preferred embodiments (by way of example, and not of limitation). The present application describes several embodiments, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition. It is contemplated and intended that the described design can be made of any suitable material.

Figure 1B:
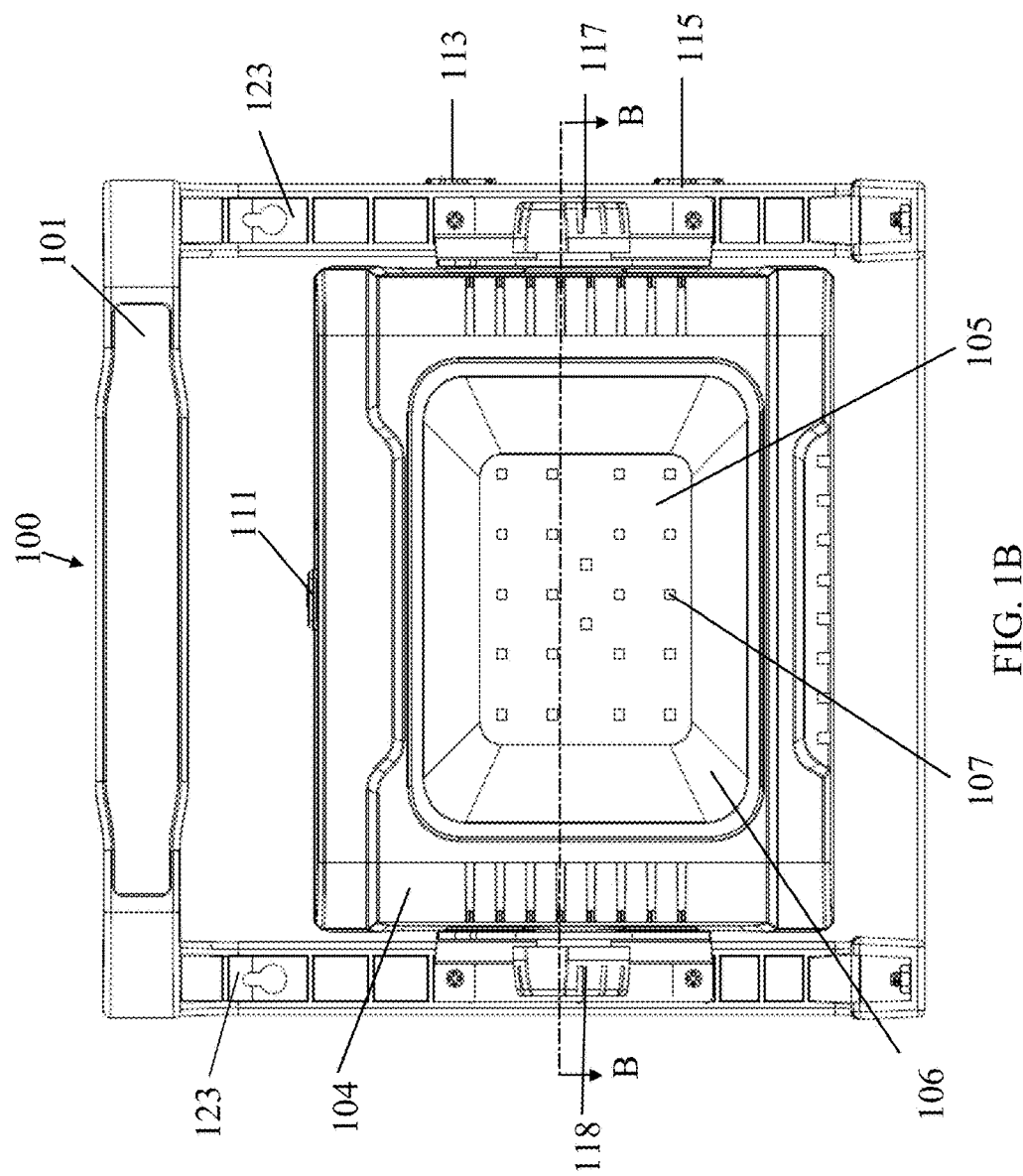
FIG. 1B is a front view of an example LED work light in accordance with this application.
Figure 1C:
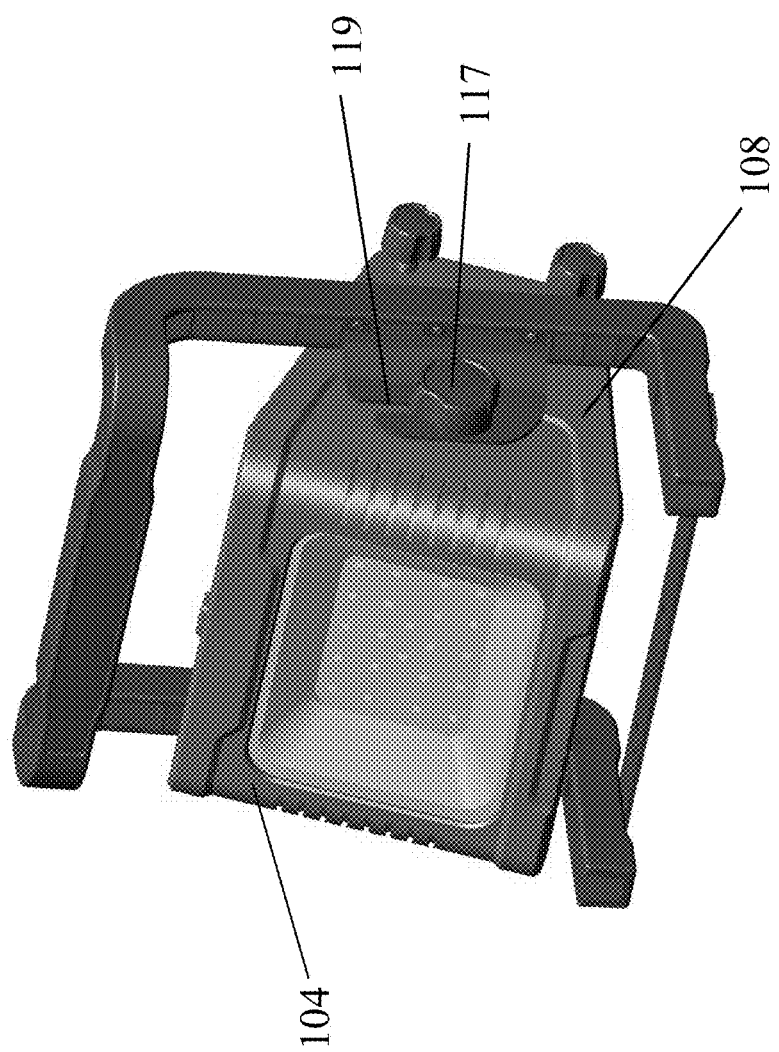
FIG. 1C is a 3D front perspective view of an example LED work light in accordance with this application.

FIGS. 1A-1C illustrate the front side an LED work light assembly 100 in accordance with an embodiment of the invention. LED work light assembly 100 includes two independent components, a carrying frame structure 112 and a LED light device 102, that are assembled together. Carrying frame structure 112 includes a supporting frame made of an entire piece, preferably molded of hard plastics, such as polycarbonate plastics. Carrying frame structure 112 is molded into three structural sections, a handle section 101, two standing sections 123 in the middle and two supporting sections 109 at bottom for standing on the ground. Frame structure 112 is preferably molded to be tubular-like with openings 110 and periodic supporting diaphragms between two side walls. On each of middle standing sections 123, a mounting ear-fin 120 is attached. Mounting ear-fin 120 has a slit 119 that receives the threaded stud of knob 117 to adjustably mount LED light assembly 102 to carrying frame 112. By adjusting knob 117, the direction of the light beam of work light 100 can be adjusted by changing the mounting angle of work light device 102, as illustrated in FIG. 1C. Carrying frame structure 112 is further stabilized with a horizontal connection piece 207 connecting between two bottom supporting sections 109.

Figure 2:
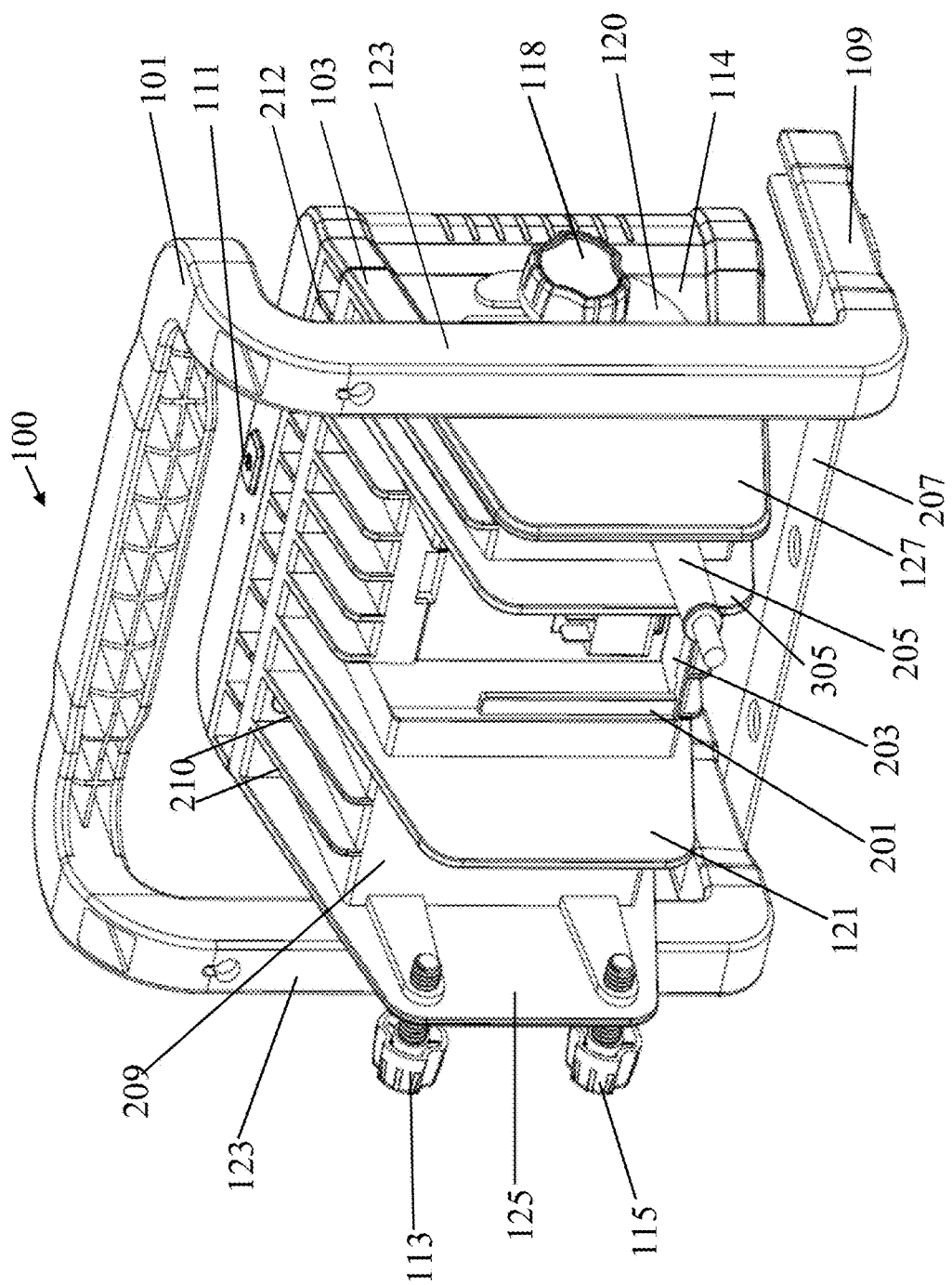
FIG. 2 is a right side perspective view of an example LED work light in accordance with this application.
Figure 3:
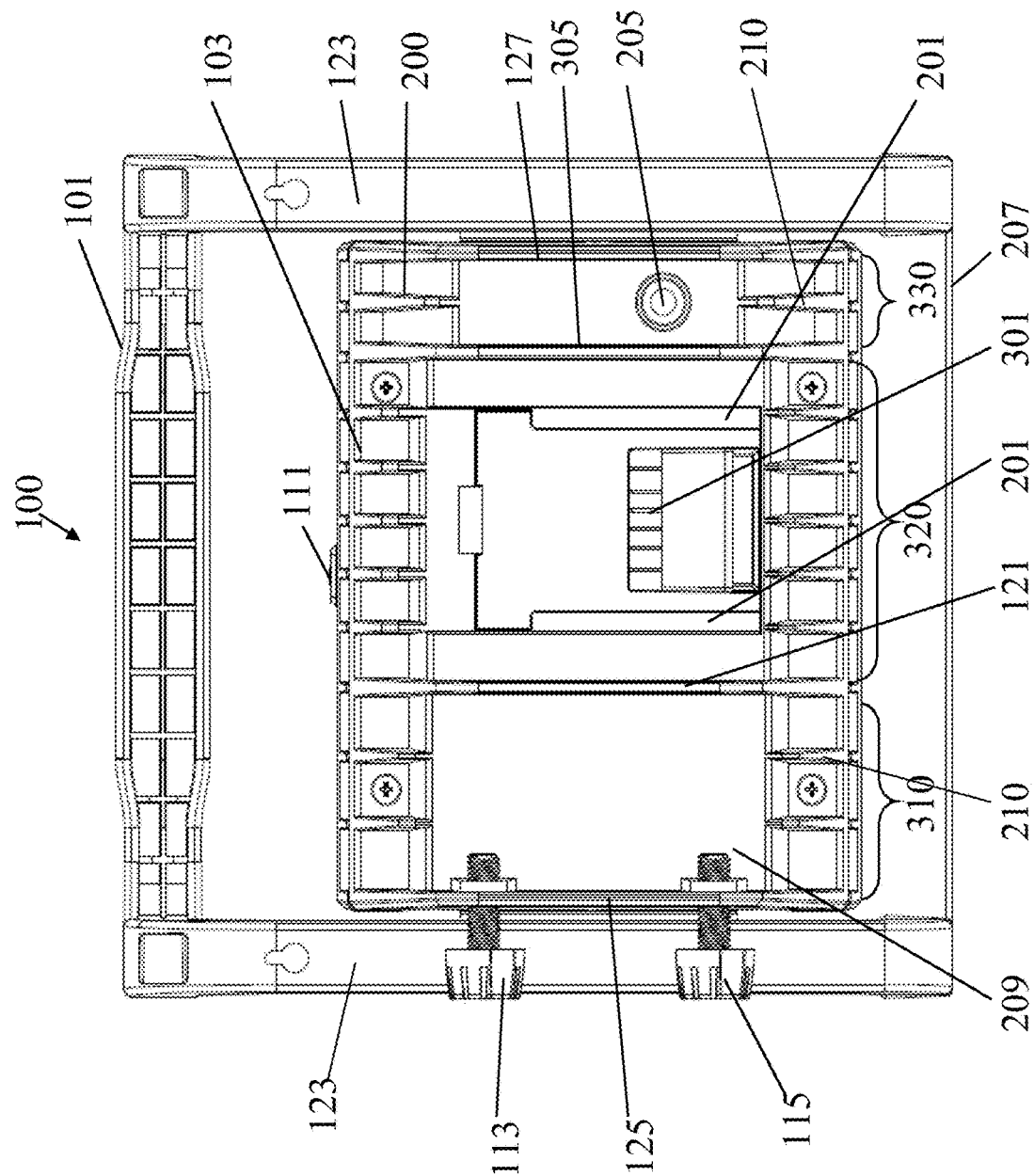
FIG. 3 is a back view of an example LED work light in accordance with this application.
Figure 4:
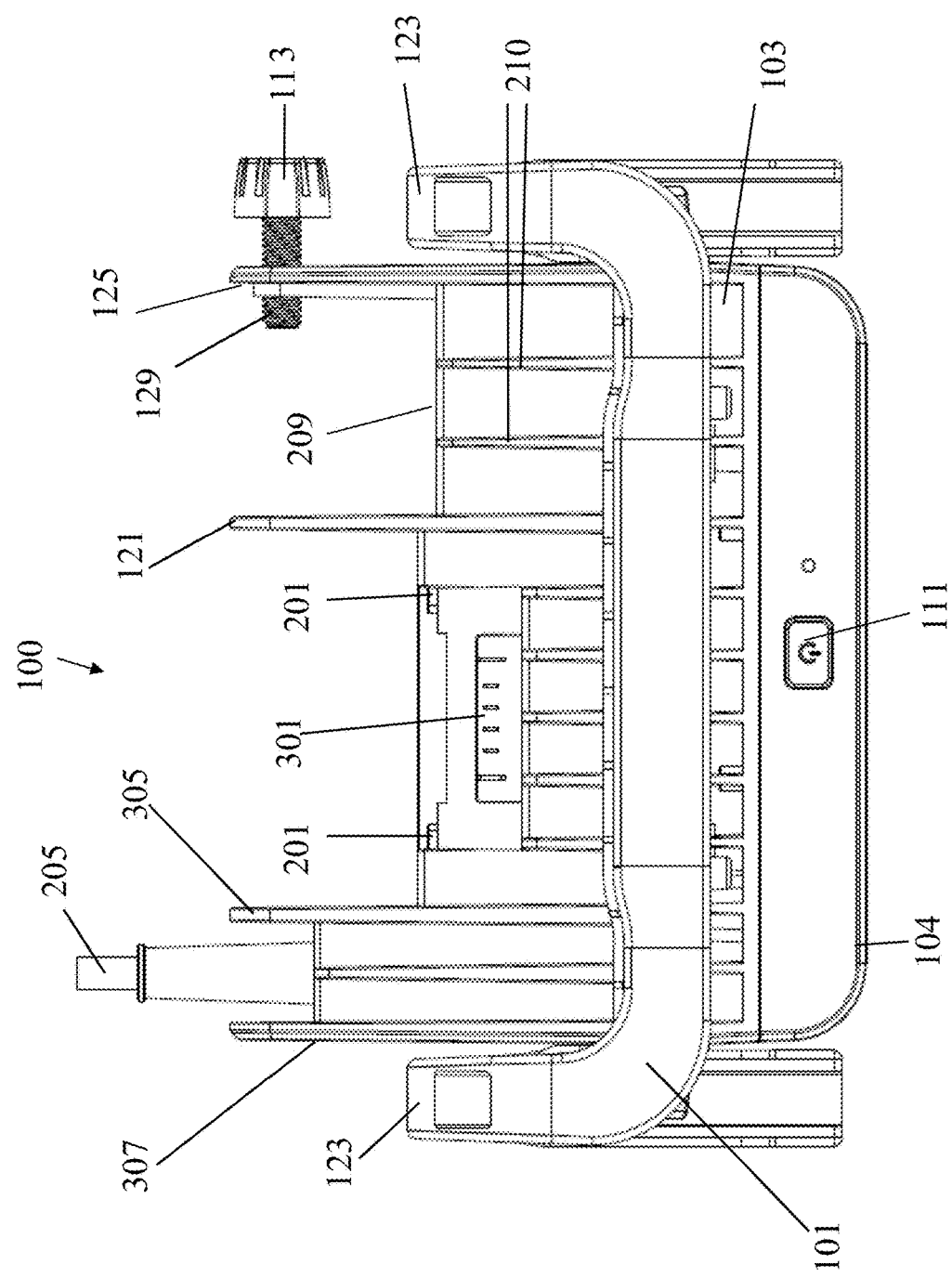
FIG. 4 is a top view of an example LED work light in accordance with this application.

In reference to FIG. 1A, FIG. 2-3, FIG. 5A and FIG. 9, the left side and right perspective views, and the explosive view of LED light assembly 102 are shown. LED light assembly 102 includes a front cover 104, a middle heating dissipating spacer 130, and a back casing 103. Back casing 103 comprises left side 108 and right side 114, a top section and a bottom section, a back section that includes a section 310 for mounting to work area, a section 320 for holding battery, and a section 330 for power cord as shown in FIG. 2 and FIG. 3.

Figure 5A:
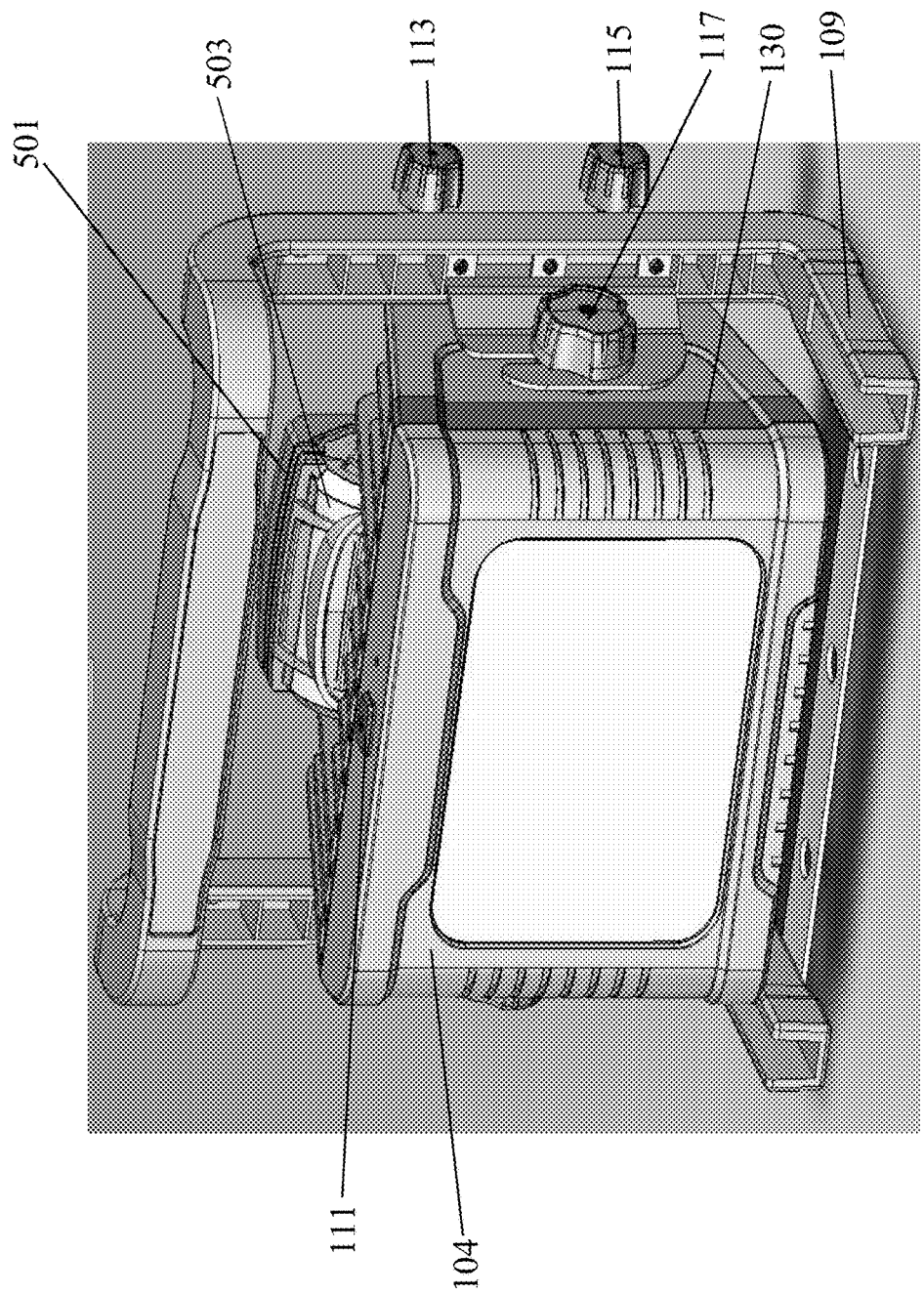
FIG. 5A is a front perspective view of an example LED work light with a battery in accordance with this application.
Figure 5B:
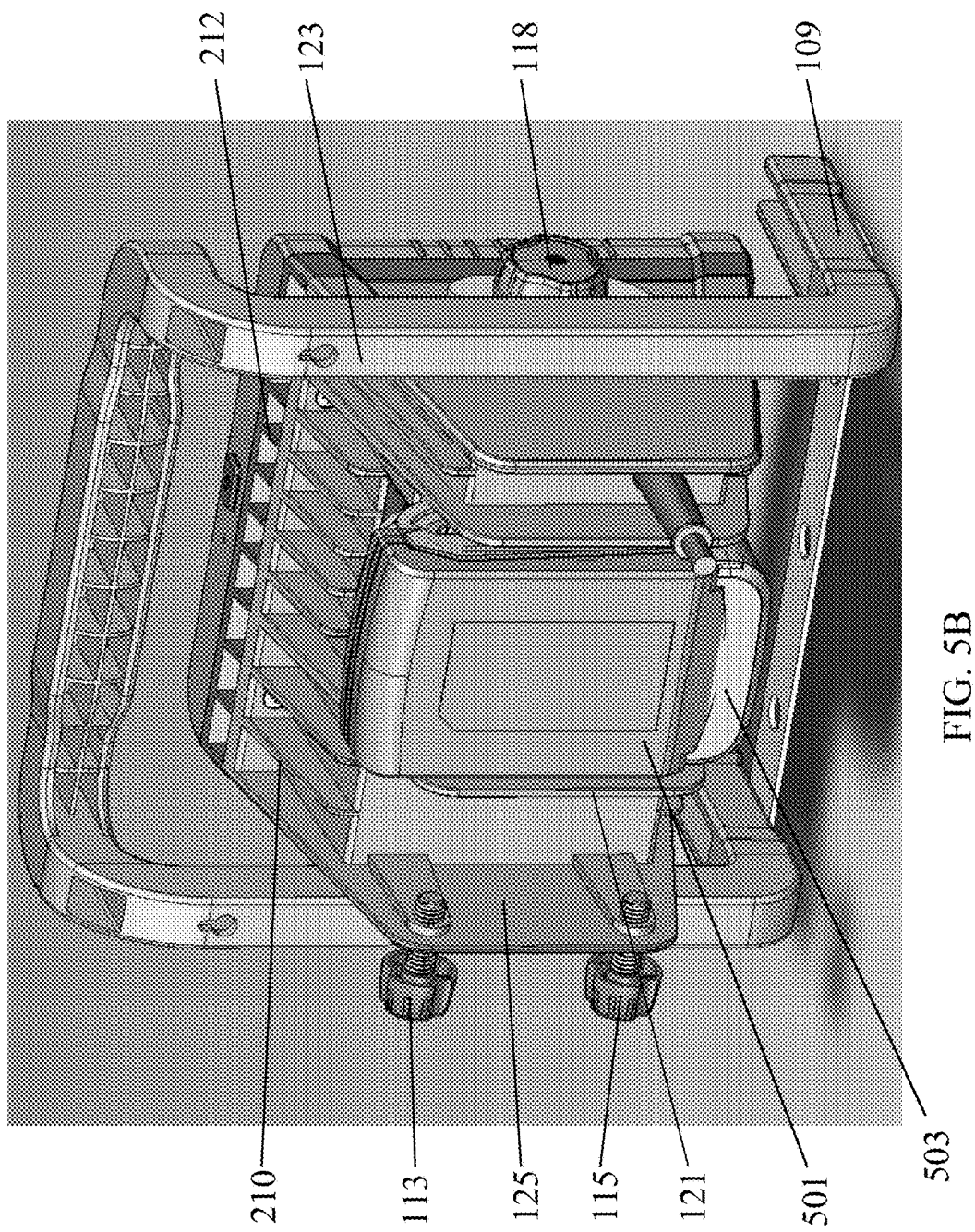
FIG. 5B is a back perspective view of an example LED work light with a battery in accordance with this application.
Figure 5C:
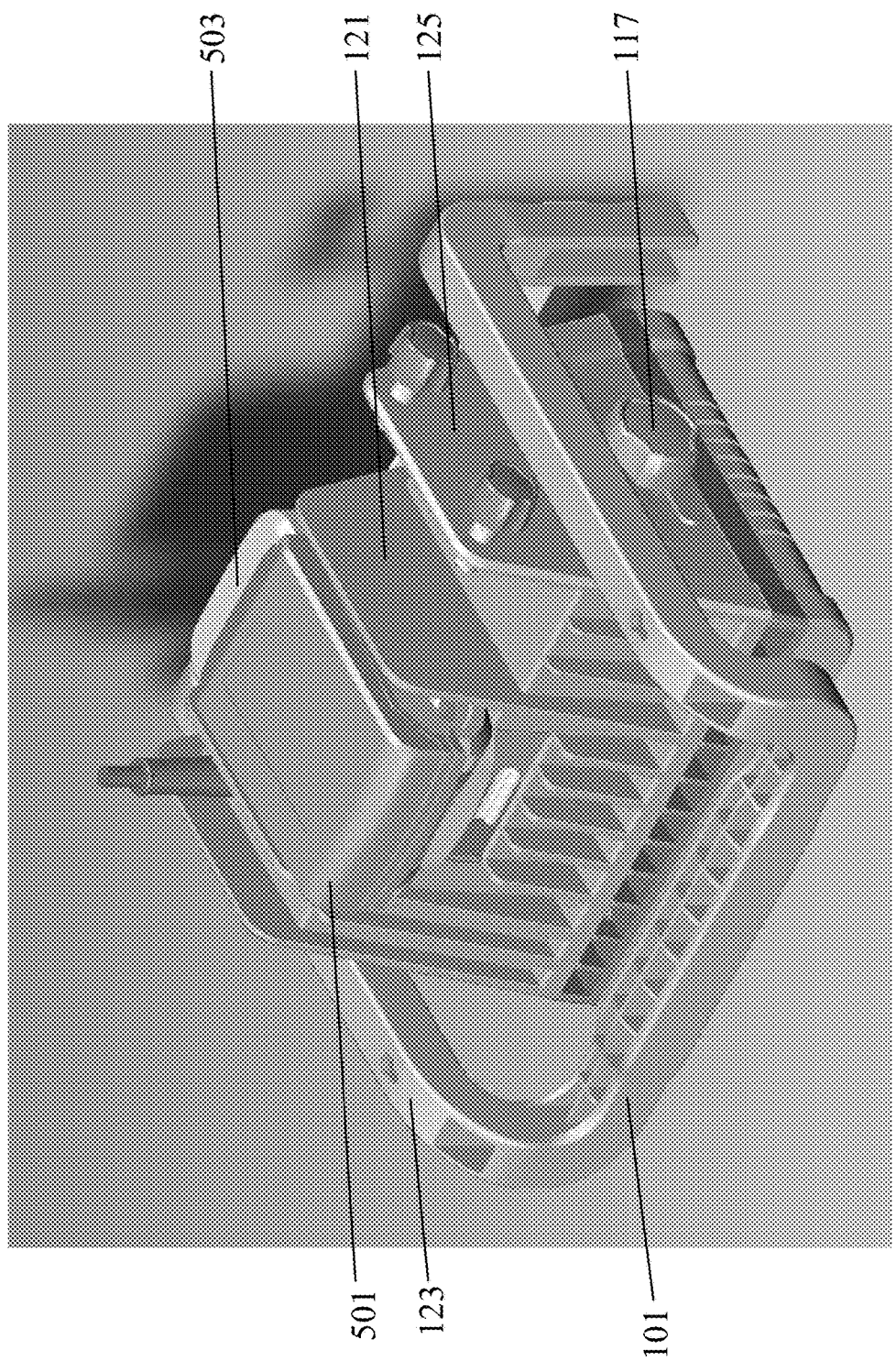
FIG. 5C is a side perspective view of an example LED work light with a battery in accordance with this application.

The front cover portion 104 anchors LED lamp device 106 that provides high intensity illumination generated by arrays of LEDs 107 disposed on base plate 105. The construction and arrangement of LEDs 107 on base plate 105 and the structure of LED lamp 106 are known and the detail of which is thus omitted. LED Lamp device 106 is configured to generate adjustable high intensity illumination from 1000 Lux to 3000 Lux. This shift in light power is controlled by switch 111 disposed on the top of front portion 104. The electrical power required for lamp device 106 may range from 8 W to 25 W. This electrical power may be provided by an external electrical supply through the power cable 205 or by a power tool battery 501 as shown in FIG. 5A. In alternative constructions, a separate button, switch, motion sensor or other actuator could be provided to activate and deactivate LED lamp device 106.

Figure 6:
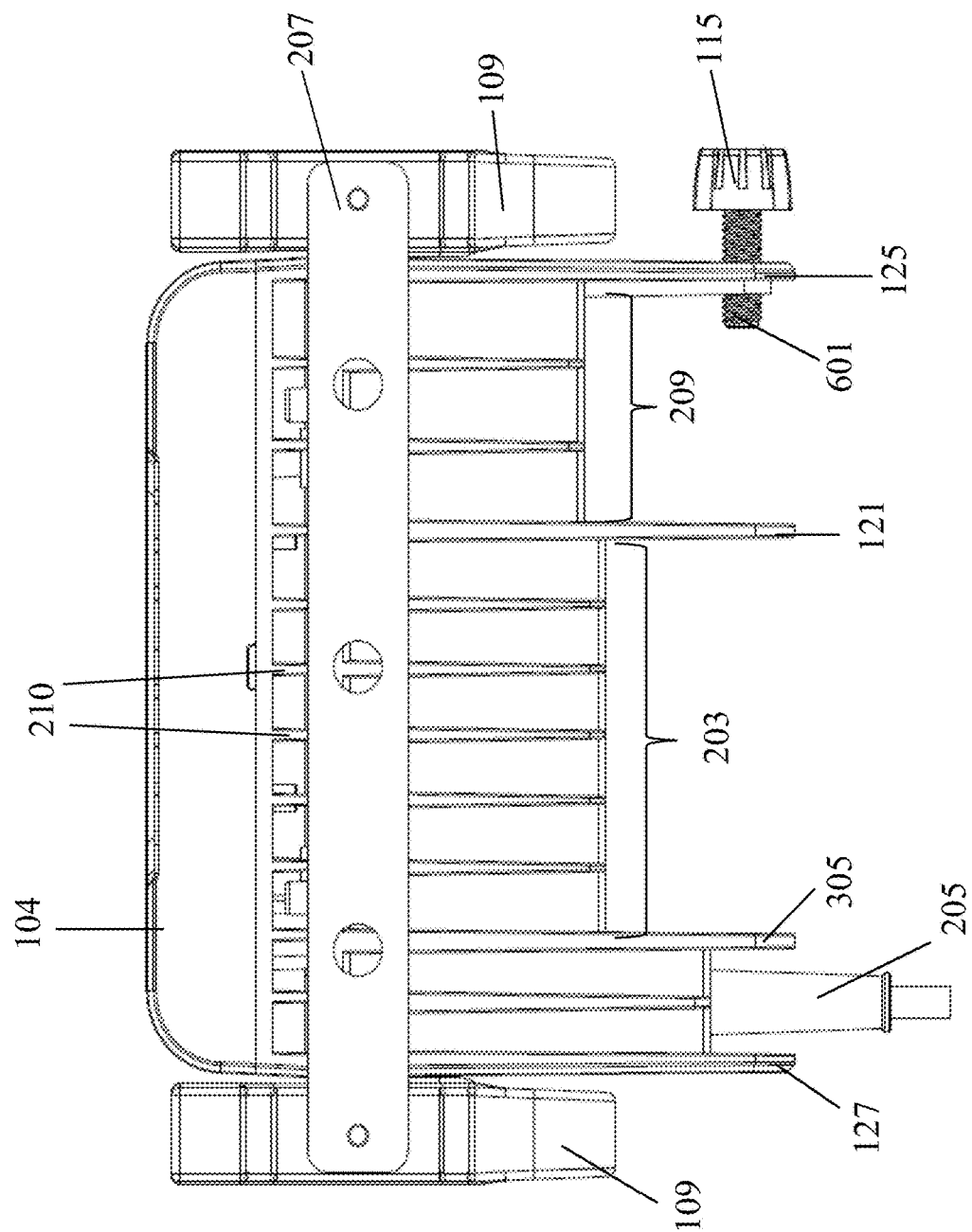
FIG. 6 is a bottom view of an example LED work light in accordance with this application.
Figure 8:
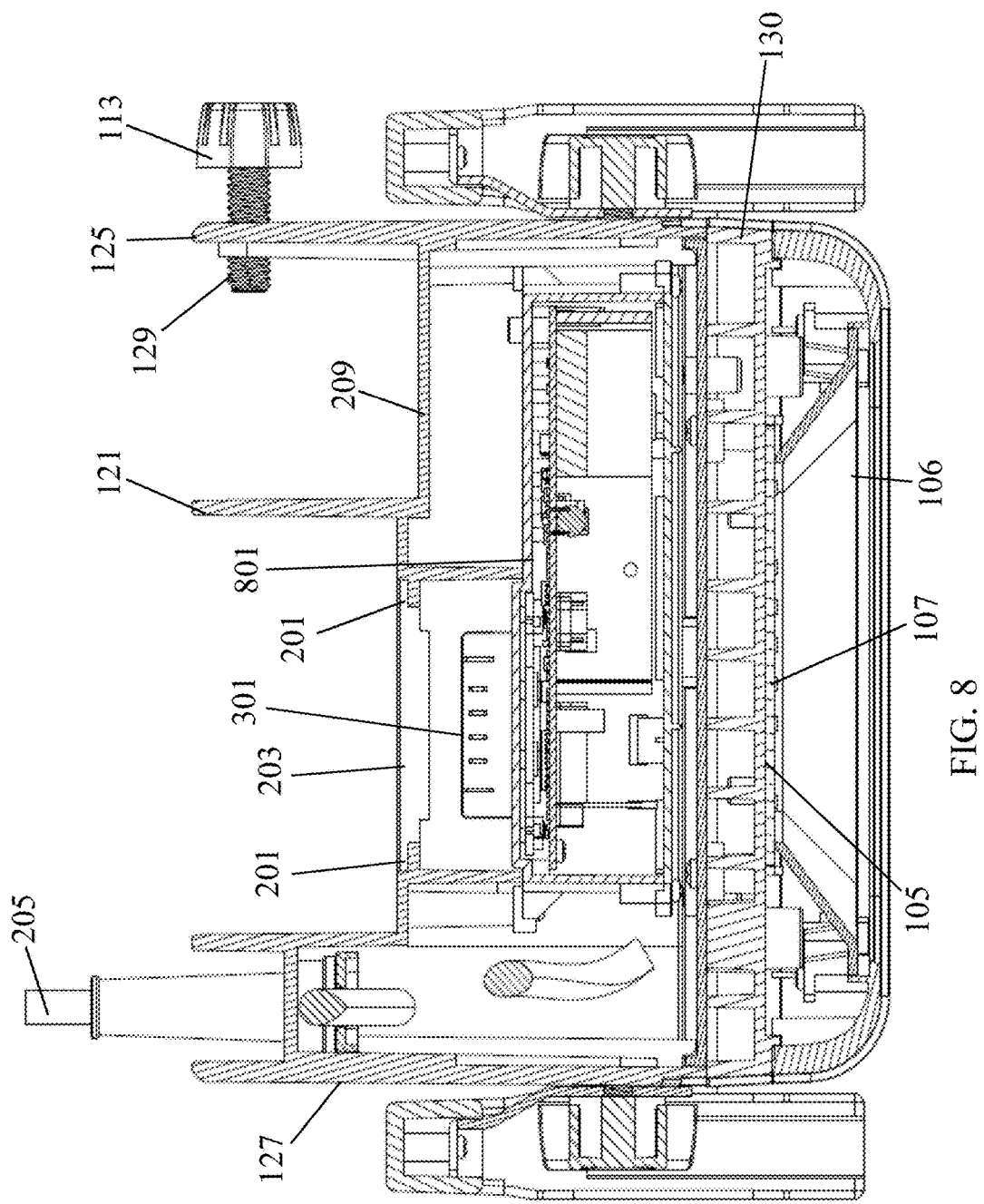
FIG. 8 is a top view of cross-section B-B in FIG. 1B in accordance with this application.

The left side portion 108 and the right side portion 114 each is disposed with a threaded hole receptacle for receiving the threaded stud of knob 117 for fixing LED lamp device 102 onto supporting frame 112. Upon use, a user will place the lamp device 102 between two middle standing sections 123 of carrying frame 112 at proper height and angle so that the threaded hole receptacles on left side portion 108 and right side portion 114 can receive the threaded studs of knobs 117 and 118, and the user can fix the relative position of lamp device 102 to slits 119 using knobs 118 and 117. Front cover 104 to together with a spacer board 130 form a compartment that houses LED lamp device 106. Spacer board 130 is constructed with pluralities of heat sinks 212 with void grid-like structures as shown in FIG. 8. In addition, the top and bottom portions of back casing 103 are also constructed with plurality of parallel heat sinks 210 for dissipating heat from LED lamp 106, as shown in FIG. 2 and FIG. 6. Front cover 104 may be made of any suitable plastic material, and both middle heating dissipating spacer 130 and back casing 103 and heat sinks are preferably made of metal, preferably magnesium alloy or aluminum alloy or other light metal alloys.

Figure 9:
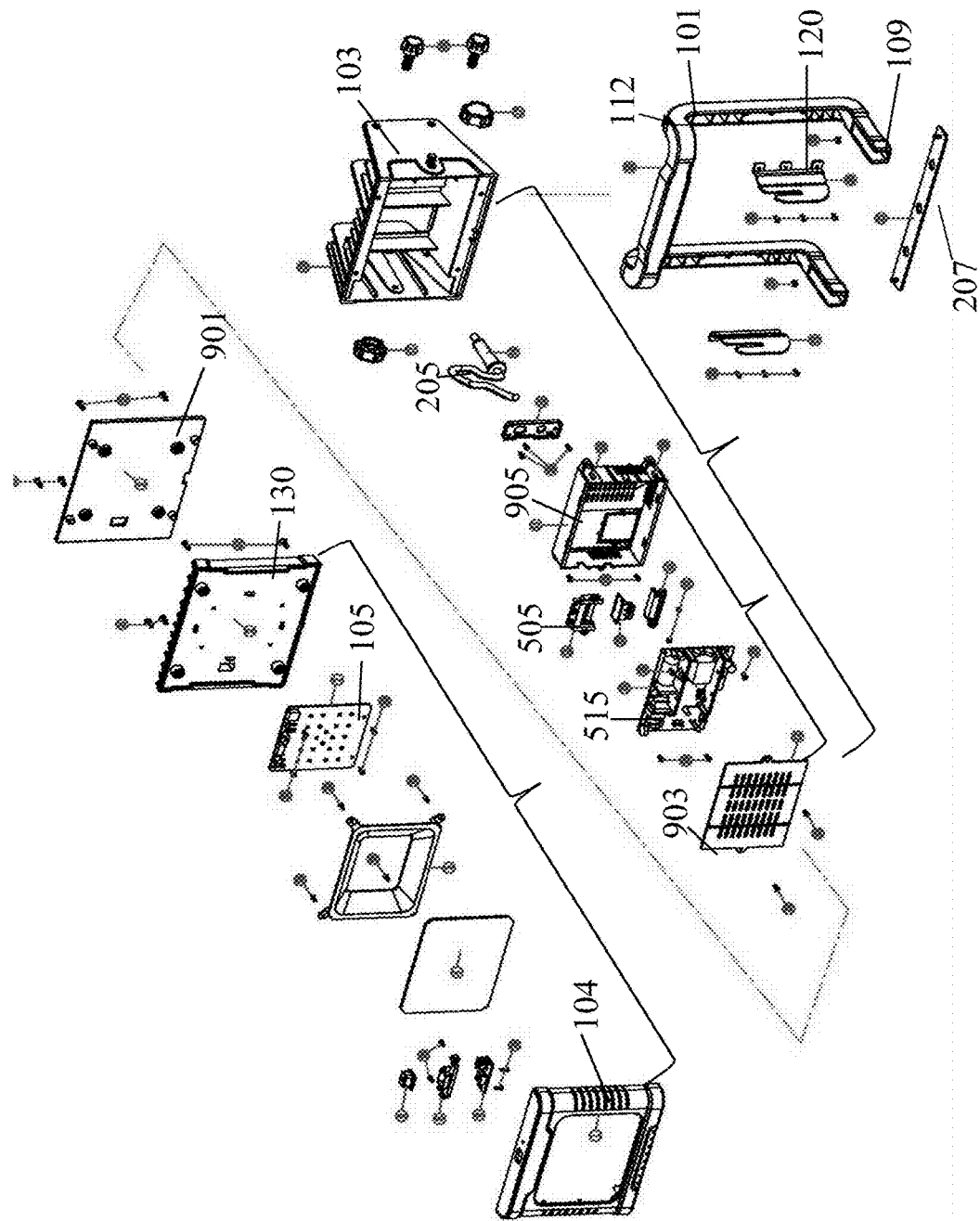
FIG. 9 is an explosive view of an example LED work light in accordance with this application.

In reference to FIG. 3, FIG. 4, FIG. 5B, FIG. 5C, FIG. 6 and FIG. 9, detailed structure of the back casing 103 of LED work light 100 is shown. Back casing 103 includes a top side, a bottom side and a back side with an open front side (FIG. 9). On the exterior of top and the bottom portion of casing 103 there are constructed a plurality of parallel heat sinks 210, and the exterior of back side includes at least three adjacent sections, section 310 for mounting to a working area, section 320 for receiving a battery pack, and section 330 for an electrical power cord. Section 310 comprises two parallelly mounting fins 125 and 121 protruding outwards that form a holding space 209 in order to hold a supporting frame or an edge. Two knobs 113 and 115 are disposed on protruding mounting fin 125 for fixing work light 100 to a frame, a border, a stand, an edge, a door, a rim or anything in the work area that is sufficient in strength and in size to withhold the work light, so that the work light is in accessible distance to the user, and the user can conveniently adjust the work light according to his/her needs while working. Knobs 113 and 115 have sufficiently strong studs with sufficient length to fix work light 100 to various holding support. Different sets of knobs 113 and 115 may be used for different surfaces or supports of different working areas.

In reference to FIG. 3, battery section 320 includes an electric receiving port 301 and a pair of holding flanges 201 that flank at the left and right sides of electric receiving port 301. A set of battery pack adapters 503 as shown in FIG. 5A are provided to match with electric receiving port 301 and the size of the holding flanges 201 to provide an adaption seating for various models of power tool battery packs that can be used as power source. Battery section 320 is preferably located in the middle between protruding mounting fin 121 and section fin 305, both of which provide protection of a battery pack.

For section 330, a large protrusion 127 may be constructed at the right side 114 that may be in parallel with section fin 305 to form protection for the power cord 205. The entire back portions are made of metals, preferably magnesium alloy or aluminum alloy or other light metal alloys. The large fin-protrusions of 125, 121, 305 and 127 then also function as efficient heat sinks for dissipating heat from lamp 106 so that the LED driver boxed inside back casing 103 will not be overheated. In use, a suitable battery pack adapter is inserted into holding flanges 201 and be placed in touch with the electric receiving port 301 and a battery pack is plugged into the adapter in order to provide electric power.

Figure 5D:
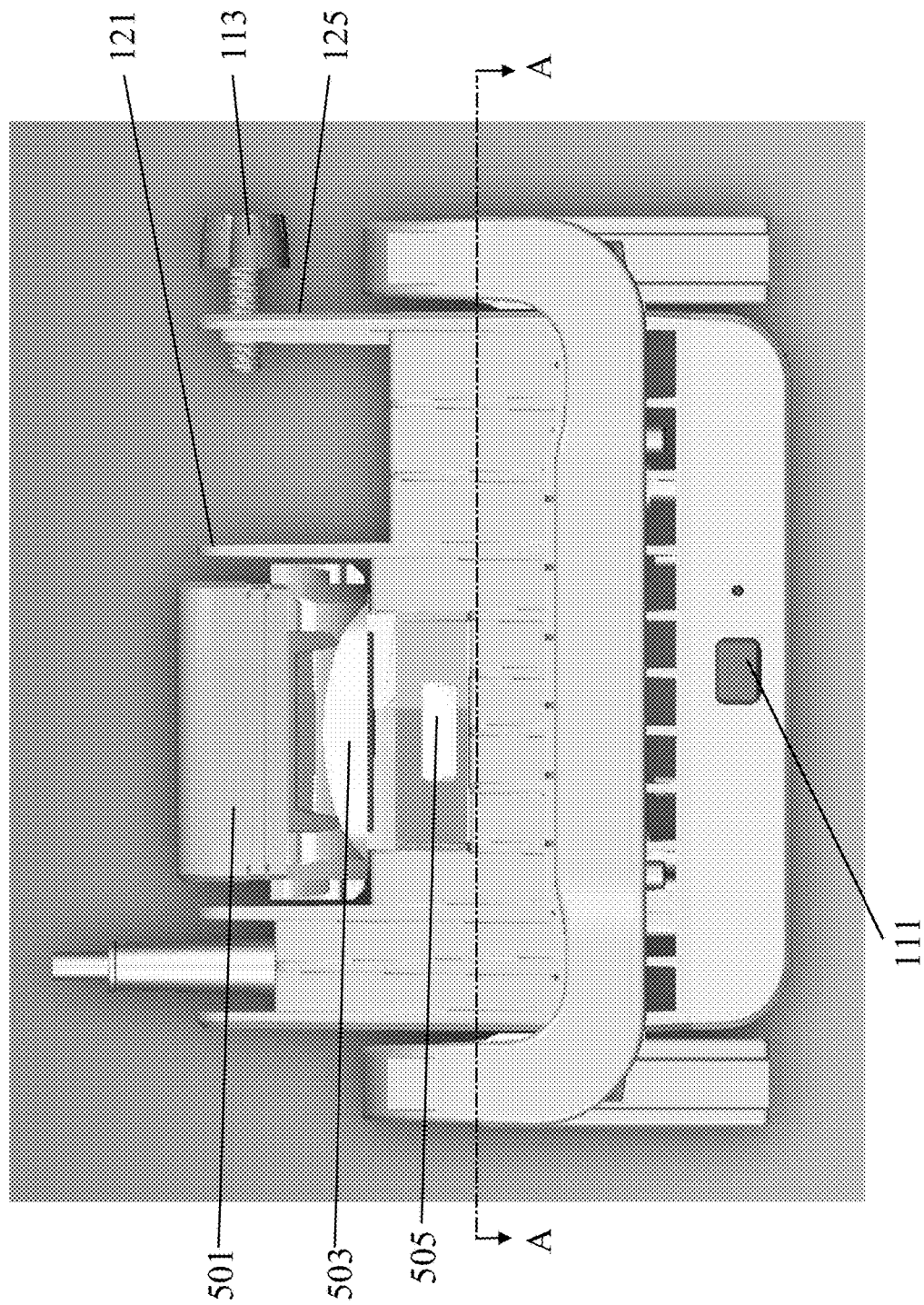
FIG. 5D is a top view of an example LED work light with a battery in accordance with this application.
Figure 5E:
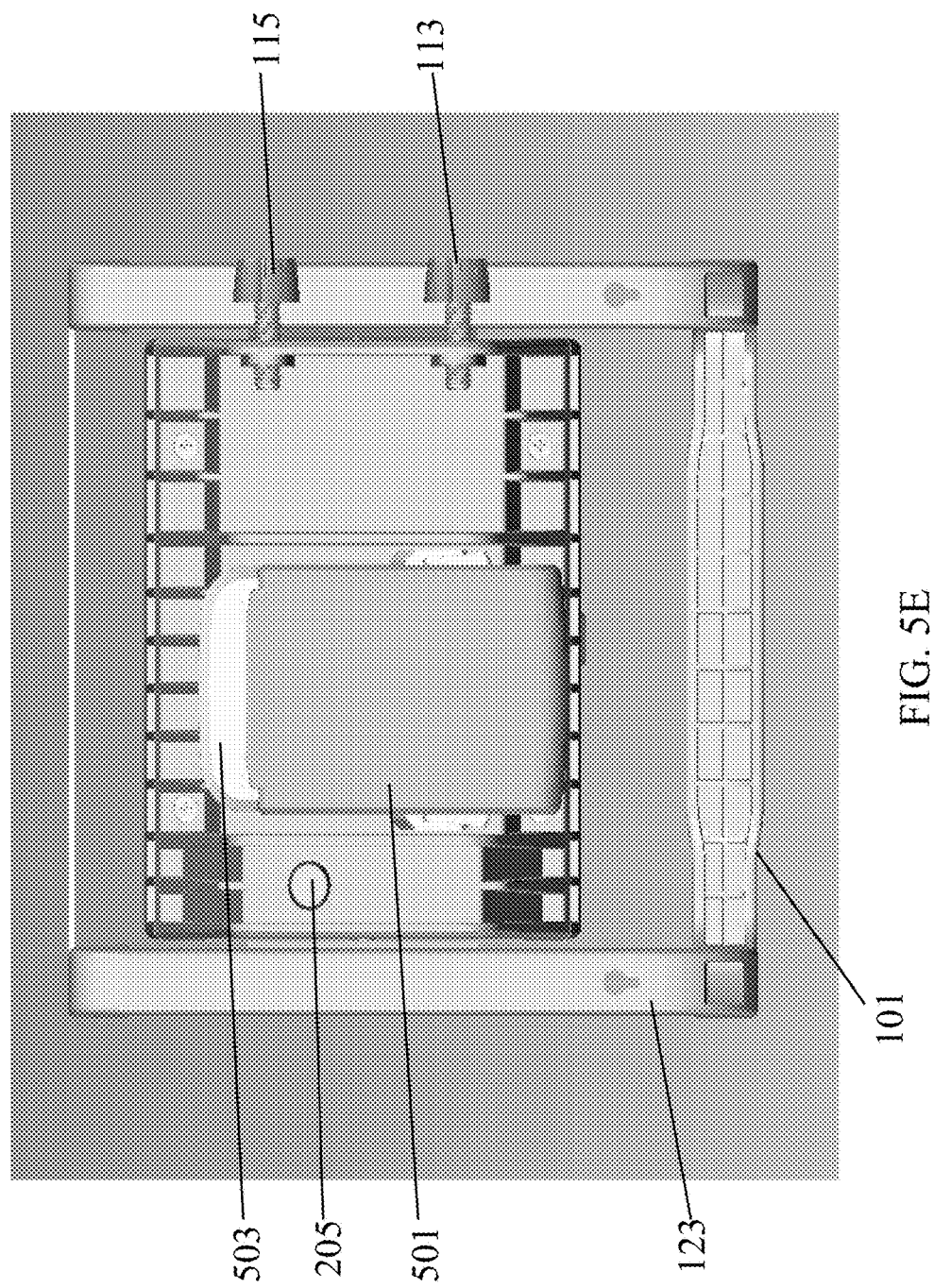
FIG. 5E is a back view of an example LED work light with a battery in accordance with this application.
Figure 5F:
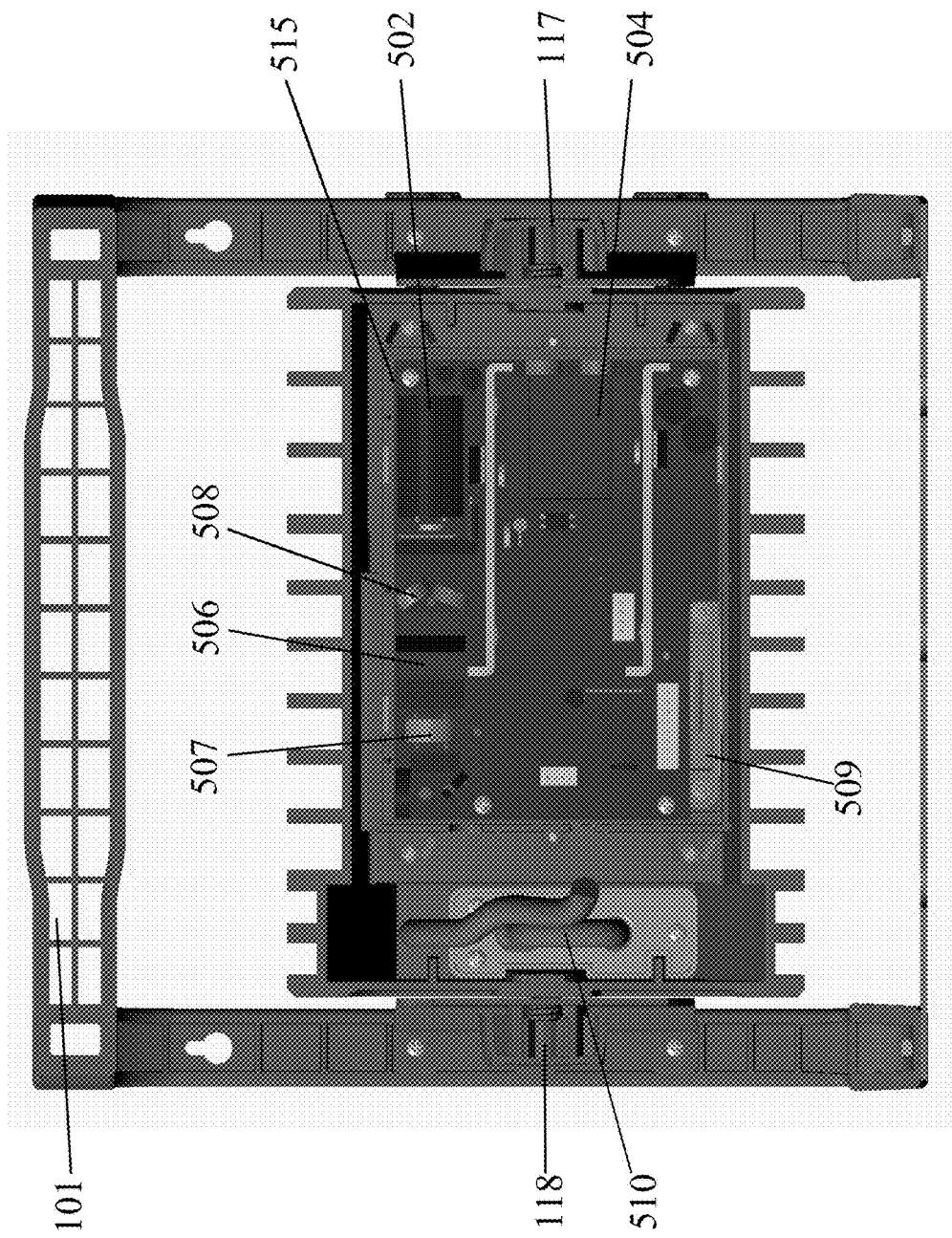
FIG. 5F is a front view of cross section A-A of FIG. 5D in accordance with this application.

In reference to FIGS. 5A to 5F, matching battery pack adapters 503 for different models of power tool batteries 501 are constructed, and a battery pack adapter 503 I configured to have a port that matches the construct of electric receiving port 301 and the size of the holding flanges 201 and have another port that matches to the specification of a particular type of battery pack. FIG. 5F shows an example arrangement of a set of known electronic components 502, 504, 506, 508, 507, 509, 510 of an LED driver configuration, the detail of which is omitted herein. A battery pack adapter 503 is constructed with electrical decoder and converter circuits that convert the battery power supply from a batter pack into an acceptable electrical supply by the LED driver electric configuration. The circuit design of battery pack adapter 503 allows for simultaneous use and recharging of the battery. The available battery adapters accommodate various battery pack models and types, for example, DEWALT DCB200, DCB203, DCB204, DCB205, DCB 206; MAKITA BL1820, BL1820B, BL1830B, BL1840, BL1840B, BL1850, BL1850B, BL1860B, MILWAUKEE 48-11-1820, 48-11-1830, 48-11-1840, 48-11-1850, BOSCH BAT612, BAT620, BAT621, BAT622, RIDGID R840085, R840086, R840087, etc. A discharging trigger mechanism 505 shown in FIG. 5D is built on the top of back casing 103 which can release a battery-pack-adapter assembly from section 320.

In reference to FIG. 6, FIG. 7A and 7B, and FIG. 8, the bottom view, the left side view, the right side view and the cross-section view of work light 100 are shown, where mounting fin 125 and mounting fin 121 formed a holding space for mounting work light 100 to a support surface in the user's area. Knobs 115 and studs 601 are sufficiently strong to grip work light 100 onto a surface that is fitted between space 209 between side fin 125 and side fin 121. The space 203 formed between protrusion 305 and 121 will fit for a battery-pack-adapter assembly.

In reference to FIG. 8 and FIG. 9, work light assembly 100 is assembled in an easy sequence in the order of from the front to the back, three easy horizontal major steps: the step of assembling the front cover and the LED device 106 to the spacer 130, the step of assembling LED driver circuits 903 and electronic components 515 to circuit box 905 which is then covered with a board 901, and the step of the entire front portion and middle portion into back casing 103. The first two steps can be independently accomplished, efficiently streamlining the entire assembling process.

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

Additional general background, which helps to show variations and implementations, may be found in the following publications, US Patent Application Pub. No. US 2014/0043800 and U.S. Pat. No. 8,425,071, all of which are hereby incorporated by reference herein for all purposes.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke of 35 USC section 112 unless the exact words "means for" are followed by a participle. The claims as filed are intended to be as comprehensive as possible, and NO subject matter is intentionally relinquished, dedicated, or abandoned.

What is claimed is:

1. An LED high intensity illumination work light assembly, comprising:
    an LED high intensity illumination light source being constructed to produce light having an intensity of at least 1000 Lux;
    a front cover for anchoring said LED high intensity illumination light source;
    a heat dissipating plate configured in matching dimension with said front cover, wherein said front cover and said heat dissipating plate forming a front compartment housing said LED high intensity illumination light source;
    a middle organization box enclosing an electronic circuit driver board and pluralities of electronic components that control said LED high intensity illumination light source when in use;
    a back casing structure configured in matching dimension to said a heat dissipating plate, having a top side, a left side, a right side, a bottom side, and a back section, said back section comprising a first fin and a second fin in side-by-side in parallel relationship, exterior of said back section, protruding outwards forming a holding slot; and
    at least one hand-knob having a threaded stud being received through a threaded hole on said first fin or said second fin, wherein the holding slot receives the threaded stud of the hand-knob when in use to adjustably mount by hand the work light assembly to a support;
    wherein said front cover, said middle organization box and said back casing structure are assembled in side-by-side front-to-back relationship to one another into a closed chamber.

2. The LED high intensity illumination work light assembly of claim 1, wherein a plurality of heat sinks, are configured on said top side and said bottom side of said back casing structure, exterior of said back casing structure, in side-by-side relationship to one another.

3. The LED high intensity illumination work light assembly of claim 1, a pair of battery receptacle flanges are configured in said back section of said back casing structure on exterior of said back casing structure.

4. The LED high intensity illumination work light assembly of claim 3, further comprising a set of battery-pack adapters that are compatible with said battery receptacle flanges.

5. The LED high intensity illumination work light assembly of claim 4, wherein each of said set of battery-pack adapters includes an electronic circuit that decodes battery power and enables recharging a battery when said LED high intensity illumination light source is in use.

6. The LED high intensity illumination work light assembly of claim 3, wherein a pair of protruding heat-sink fins are further configured on exterior of said back casing structure, and said battery receptacle flanges being configured in-between said holding slot and said pair of protruding heat-sink fins.

7. The LED high intensity illumination work light assembly of claim 1, further comprising a carrying frame mounted with an anchor ear-piece having a slit receiving a threaded stud of a hand knob, and said threaded stud being further received into a threaded receptacle aperture configured on said left side or said right side of said back casing structure, wherein said work light assembly is enabled to be fixed on said carrying frame at a plurality of facing angles.

8. The LED high intensity illumination work light assembly of claim 7, wherein the carrying frame comprises an entire piece of frame bent into three sections including a handle section, a middle standing section and a bottom supporting section.

9. The LED high intensity illumination work light assembly of claim 1, wherein said a back casing structure is made of magnesium alloy.

10. The LED high intensity illumination work light assembly of claim 1, wherein said heat dissipating plate is made of metal, and a plurality of heat sink structures are configured on exterior of said heat dissipating plate.

* * * * *